United States Patent [19]

Keesen et al.

[11] Patent Number: 4,814,871

[45] Date of Patent: Mar. 21, 1989

[54] METHOD FOR THE TRANSMISSION OF A VIDEO SIGNAL

[75] Inventors: Heinz-Werner Keesen, Hanover; Wolfgang Hartnack, Hemmingen, both of Fed. Rep. of Germany

[73] Assignee: Deutsche Thomson-Brandt GmbH, Villingen-Schwenningen, Fed. Rep. of Germany

[21] Appl. No.: 83,888

[22] Filed: Aug. 10, 1987

[30] Foreign Application Priority Data

Aug. 8, 1986 [DE] Fed. Rep. of Germany ....... 3626916

[51] Int. Cl.$^4$ .............................................. H04N 7/12
[52] U.S. Cl. .................................... 358/133; 358/135; 358/13
[58] Field of Search ................. 358/133, 135, 136, 13; 364/725-727

[56] References Cited

U.S. PATENT DOCUMENTS

| | | | |
|---|---|---|---|
| 4,196,448 | 4/1980 | Whitehouse et al. | 358/135 |
| 4,270,025 | 5/1981 | Alsup et al. | 358/135 |
| 4,375,650 | 3/1983 | Tiemann | 358/133 |
| 4,405,936 | 9/1983 | Peters | 358/13 |
| 4,541,012 | 9/1985 | Tescher | 358/133 |
| 4,633,296 | 12/1986 | Cham et al. | 358/133 |
| 4,672,441 | 6/1987 | Hoelzlwinimer et al. | 358/135 |

OTHER PUBLICATIONS

Enzelbilduebertragung mit Wachsender Aufloesung Herbert Lohscheller, Jun. 22, 1982.
W. F. Schreiber, "Picture Coding" Proceedings of the IEEE, vol. 55, No. 3, Mar. 1967, pp. 320-330.
W. K. Pratt, "Spatial Transform Coding of Color Images", IEEE Transactions on Communication Technology, vol. Com-19, No. 6, Dec. 1971, pp. 980-991.
M. P. Ekstrom, *Digital Image Processing Techniques*, Academic Press, Inc., 1984, pp. 188-202.
"Transform Coding", pp. 530-533.

*Primary Examiner*—James J. Groody
*Assistant Examiner*—John K. Peng
*Attorney, Agent, or Firm*—Spencer & Frank

[57] ABSTRACT

A method for the transmission of a video signal, in which the analogue signal is converted into a digital signal and is digitally transmitted. However, before the transmission is transformed into the spectral domain, some portions of the digital signals are variously weighted on the basis of the physiological behavior of the eye. This weighting is performed by coding the signals to be transmitted in their representational accuracy.

15 Claims, 3 Drawing Sheets

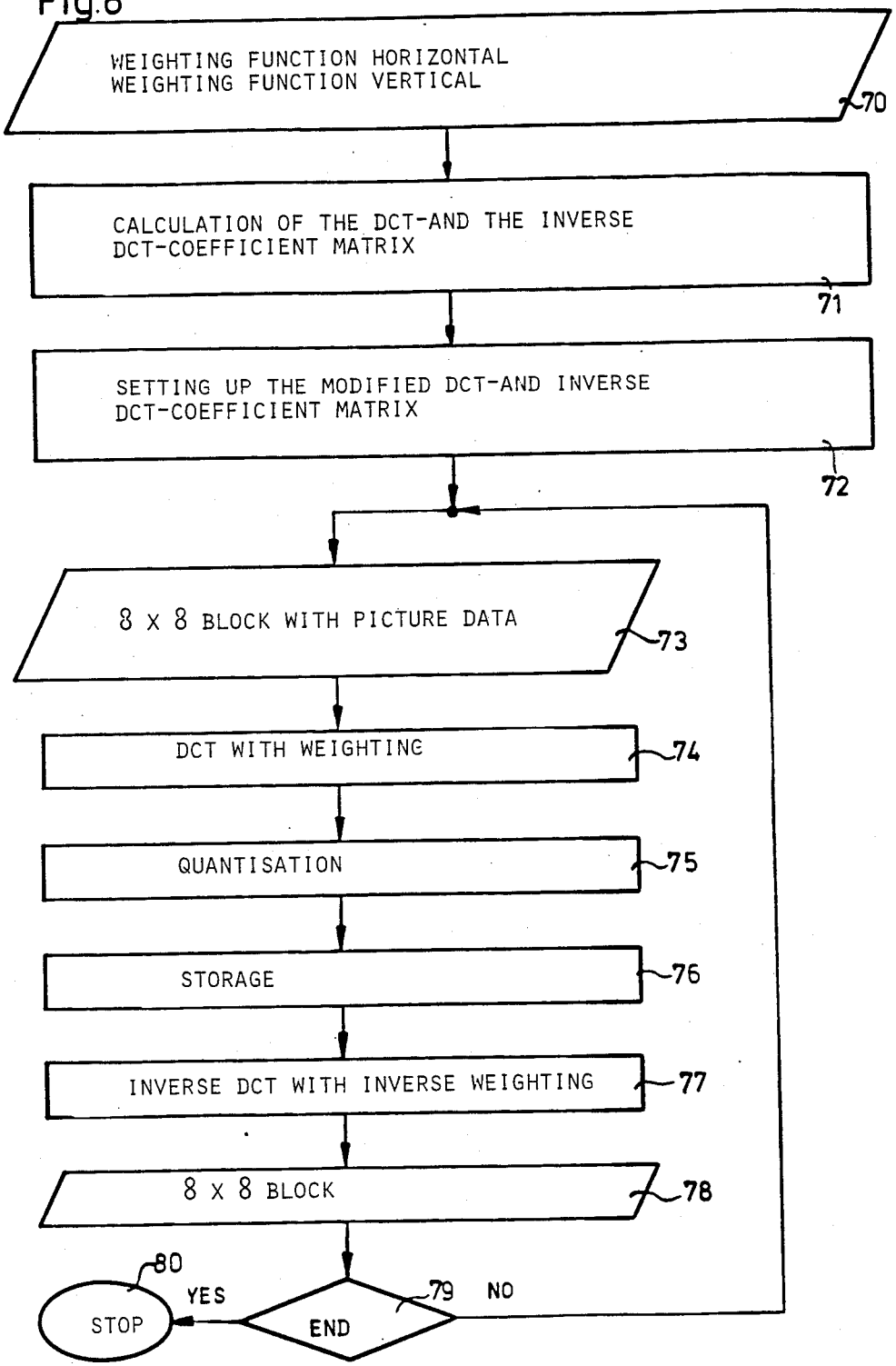

METHOD FOR THE TRANSMISSION OF A VIDEO SIGNAL

BACKGROUND OF THE INVENTION

The invention relates to a method for the transmission of a video signal.

It is known, from the dissertation work at the Faculty for Electro-Technology of the Rheinisch-Westfahlischen Technical High School, Aachen "Individual picture transmission with increasing resolution" by H. Lohscheller of June 22, 1982, (Page 6) that the intelligence volume may be reduced significantly by the introduction of methods of source coding whereby the transmission time is reduced. The source coding achieves this reduction of the intelligence volume by discarding redundant and irrelevant signal portions.

SUMMARY OF THE INVENTION

It is the object of the invention to simplify the process of source coding.

A weighting at certain places in calculations can lead to a data reduction in accordance with the physiology of the eye. The weighting can be achieved in such a way that after a transformation and/or reverse transformation, the resultant matrices can be multiplied by a weighting function in further calculations. The weighting function consists in the simplest case of a constant and can be different in horizontal and/or vertical direction so as to be adapted to the physiology of the eye, the picture content and/or the line orientated television standard.

For the better understanding of the invention, the following practical examples will be further elucidated with the aid of figures.

BRIEF DESCRIPTION OF THE DRAWING

FIG. 7 shows a two-dimensional reverse transforming current with integrated weighting and FIG. 8 shows a method flow diagram.

DESCRIPTION OF THE INVENTION

Figure 1:
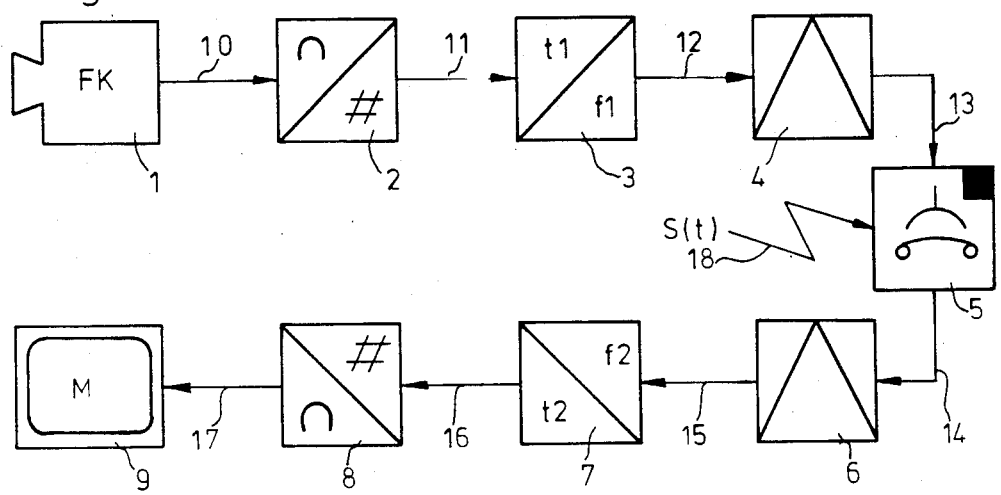
FIG. 1 shows a block diagram of a communication system.

FIG. 1 shows a block diagram of a representative intelligence transmission system having, at a sending side, a television camera 1, a A/D converter 2 hereinafter called ADU (analogue-to-digital-converter), a transforming circuit 3, hereinafter called the transformer, and a modulator 4; and having, at a receiving side, a store 5 and a demodulator 6, a reverse transforming circuit 7 hereinafter called a reverse transformer or inverse transformer, a D/A-converter 8 hereinafter called DAU (digital-to-analogue converter), and a monitor 9.

Conductors 10-17 are arranged between the individual constructional groups 1-9. The constructional groups 2-8 and 10-17 are arranged in a video recorder. A disturbance S(T) 18 influences the magnetic tape store 5. The television camera delivers a video signal via the conductor 10 to the ADU 2.

The ADU 2 converts the analogue video signals into digital video signals and transfers these digital signals to the transformer 3. The transformer 3 transforms the digitalised video signals from the time domain to the spectral domain, hereinafter called the frequency domain. Transformation implies that the digitalised video signals, expressed as numbers, are arranged blockwise as matrices and are multiplied matrix-wise. The digitalised values in the frequency domain are called spectral coefficients. The spectral coefficients arrive at the modulator 4 via a conductor 12.

The modulator 4 modulates the spectral coefficients and transfers the modulated spectral coefficient over a conductor 13 to a magnetic store 5. The magnetic store 5 can be replaced by a transmission path. The recorded signals from the magnetic store 5 arrive at a demodulator 6 over a conductor 14. The demodulator 6 demodulates the spectral coefficients. The demodulated spectral coefficients are passed on over a conductor 5 to the reverse transformer 7.

In the reverse transformer 7 the inerse function to that of the transformer 3 is performed. The spectral coefficients are translated in the reverse transformer from the frequency domain to the time domain. The digitalised video signals which find themselves in the time domain are applied to the DAU 8 over the conductor 16. The digitalised video signals are converted into analogue signals in the DAU 8 and are applied over a conductor 17 to the monitor 9, hereinafter called the picture screen. The signals which are picked up by the television camera 1 are made visible on the picture screen 9. The reverse-transformed analogue signals are not necessarily identical with the digitalised signals prior to the transformer 3 at the sending side because irrelevant and redundant portions of the digitalised signals are suppressed and filtered out prior to transmission (storage).

Figures 2, 3:
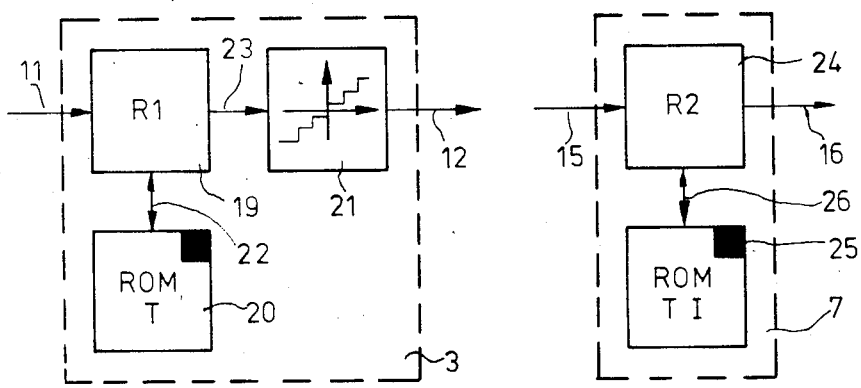
FIG. 2 shows a two-dimensional transforming circuit.
FIG. 3 shows a two-dimensional reverse transforming circuit.

FIG. 2 shows a block diagram of a transformer circuit 3 for a two dimensional transformation, for example a discrete cosine transformation, hereinafter called DCT, with 8×8 picture points, hereinafter called pixels or picture elements.

In a calculator 19 vertical and horizontal, that is two dimensional, transformations are performed one after another, that is serially, which is possible because the same transformation matrix coefficients can be used for each transformation. The transformation matrix coefficients are stored in a store ROMT 20. The abbreviation ROMT stands for a read-only memory and transformation. Eight data lines lead to the calculator 19. The incoming data are multiplied by the transformation coefficients from a store 20 and stored away in the calculator 19.

After the digitalised picture signals of a picture segment, that is to say a block of 8×8 pixels are tranformed unidimensionally, the transformed stored values are multiplied a second time with the same transformation coefficient from the store 20. In this way two dimensional tranformation is carried through. The transformation coefficients are advanced over eight data conductors 22 from the store 20 to the calculator 19. In addition to these data conductors 22 control and address conductors 22 are taken to the store 20 as a control and address bus 22, since the calculator 19 must supply the store 20 not only with the command signals but also the receipt signals and the addresses for transformation coefficients.

Eight data conductors lead from the calculator 19 to a quantiser 21. The quantiser 21 quantises the incoming values that is it associates bands of spectral values with a single number, whereby a first weighting is carried out. By reason of the quantising in quantiser 21 small, spectral portions particularly high frequencies not perceptible to the eye, are set to zero. As their value is not then transmitted, a data reduction results. The single number is promulgated over eight data conductors 12 to the demodulator 4. The calculator 19 implements the following equality:

-QE-=-T-*-E-*-T-,

Therein the following meanings apply:
-QE-: Matrix of transformed digitalised video signals of the source picture points at the quantiser input,
-T-: Transformation matrix, for example DCT, with transformation coefficients and
-E-: Matrix of digitalised video signals of the source picture points, for example the 8×8 pixels.

The spectral values derived with weighted transformation co-efficients are quantised, to achieve a data reduction.

FIG. 3 shows the inverse transformer 7 arranged at the receiver side. The demodulated digital signals proceed from the demodulator 6 by way of the conductor 15 to the calculator 24. The calculator 24 carries through the inverse functions relative to the transformer 3. To this end, the calculator connects a store ROMTI (random only memory transformation inverse) 25 by way of a data-, address- and control bus 26. The calculator 24 twice performs a reverse-transformation (reverse=inverse).

After the reverse transformation, the reverse-tranformed digital signals are passed on by way of a data bus 16 with eight conductors to the DAU 8. A store is moreover provided in the calculator 24, which stores away the spectral coefficients after a first reverse-transformation, then carries through a second (reverse) transformation and thereupon gives out the reverse-transformed signals by way of the data-bus 16. In this procedure, the same reverse transformation coefficients, which are stored away in the store 25, are used twice.

A first transformation can be a vertical transformation; a second transformation can be a horizontal transformation. The calculator 24 functions according to the following equality:

-A-=-Ti-*-KA-*-T-.

Therein the following meanings apply
-A-: Matrix of reverse transformed digital picture signals of the source picture points,
-Ti-: Reverse-transformation matrix and
-KA-: Matrix of transformed picture signals of the source picture points at the channel output, for example -QE-, which come from the magnetic store 5 and are demodulated by the demodulator 6.

Figure 4:
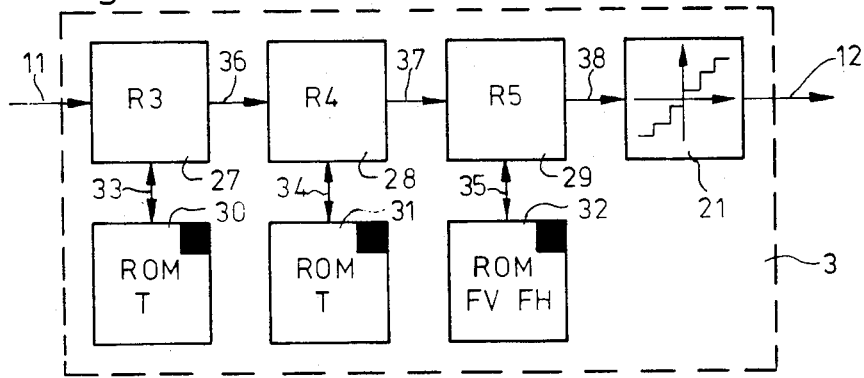
FIG. 4 shows a two-dimensional transforming circuit with weighting.

FIG. 4 shows a transformer 3 which carries out a transformation more quickly. With this in view, calculators 27 and 28 are provided which carry out two one-dimensional transformations serially. In this case neither of the calculators requires to possess a store, but it follows that values must be temporarily buffered.

Eights bits in parallel are delivered to the calculator 27 by way of a data bus 11 with eight conductors. Transformation coefficients are delivered from the store 30 by way of the data bus 33 to the calculator 27. The conductors 33 include additional control and address conductors which communicate a command from the calculator to the store.

In the calculator 27, the digitalised signals are multiplied with the help of transformation equalities and are passed on over the data bus 36 to the calculator 28. At the input of the calculator 28 spectral coefficients arise which exhibit a one dimensional transformation. The calculator 28 receives transformation coefficients from this store 31 by way of data-, control- and address-conductors 34. The data signals arrive over a data conductor of 34, the control and address signals are provided by way of control and address conductors of 34.

The stores 30 and 31 can produce equal spectral coefficients. This is however not absolutely necessary. Two calculators 27 and 28 are provided to make possible the more rapid carrying through of the transformations. After the two transformations the 2-dimensional spectral coefficients are passed on to the calculator 29 over the data bus 37 having eight data conductors.

A second weighting at pre-determined places of the calculation can lead to a data reduction compatible with the physiology of the eye. The second weighting can therefore be achieved in that after the transformation, or the reverse-transformation, the resultant matrix is multiplied in the calculators with a weighting function FVFH which is stored in ROM 32. The function for the second weighting can be different in horizontal and vertical directions in order to suit the physiology of the eye and/or the picture content and/or the line orientated television standard. Accordingly an additional ROM, together with the ROM for the transformation coefficients, is necessary for the function of the second weighting which is carried through in an additional multiplier.

The 2-dimensional spectral coefficients arising on the data conductors 37 are weighted in the calculator 28 for the second time. To this end, a store 32, guided from the calculator 28, yields the weighting coefficients to the calculator 29, wherewith the 2-dimensional spectral coefficients are turned up, valued and/or multiplied. Eight bits in parallel are passed on by way of the data bus 38 having eight data conductors to the quantiser 21. There, the digitalised 2-dimensional spectral coefficients, influenced by a weighting factor, are quantised (according to the first weighting) and are applied to the demodulator by way of eight bit parallel data conductors 12.

$$-R3A- = -T1- * -E-,$$
$$-R- = -R3A- * -T2- \text{ and}$$

$$-Q1- = \begin{bmatrix} -FS(1) & 0 & 0 & 0 & 0 & 0 & 0 & - \\ -0 & - & 0 & 0 & 0 & 0 & 0 & - \\ -0 & 0 & - & 0 & 0 & 0 & 0 & - \\ -0 & 0 & 0 & - & 0 & 0 & 0 & - \\ -0 & 0 & 0 & 0 & - & 0 & 0 & - \end{bmatrix} \cdot * -R- * \begin{bmatrix} -FW(1) & 0 & 0 & 0 & 0 & 0 & 0 & - \\ -0 & - & 0 & 0 & 0 & 0 & 0 & - \\ -0 & 0 & - & 0 & 0 & 0 & 0 & - \\ -0 & 0 & 0 & - & 0 & 0 & 0 & - \\ -0 & 0 & 0 & 0 & - & 0 & 0 & - \end{bmatrix}$$

-continued

|      |     |   |   |   |   |   |   |       |   |     |   |   |   |   |   |   |       |   |
|------|-----|---|---|---|---|---|---|-------|---|-----|---|---|---|---|---|---|-------|---|
|      | -0  | 0 | 0 | 0 | 0 | — | 0 | 0     | . | -0  | 0 | 0 | 0 | 0 | — | 0 | 0     | . |
|      | -0  | 0 | 0 | 0 | 0 | 0 | — | 0     | . | -0  | 0 | 0 | 0 | 0 | 0 | — | 0     | . |
|      | -0  | 0 | 0 | 0 | 0 | 0 | 0 | FS(d) | . | -0  | 0 | 0 | 0 | 0 | 0 | 0 | FW(d) | . |

Therein the following meanings apply:
  d: number of the picture point of the picture pointmatrix in horizontal or vertical direction.
  $FW(i),: i=1 \ldots d$, weighting function for a horizontal direction
  $FS(i),: i=1 \ldots d$, weighting function for a vertical direction,
  -R3A-: spectral coefficient matrix at the output of the calculator 27,
  -R-: spectral coefficient matrix at the output of the calculator 28,
  -Q1-: spectral coefficient matrix at the output of the calculator 29 and at the input of the quantiser 21,
  -T1-: transformation coefficient matrix in the store 30,
  -T2-: transformation coefficient matrix in the store 31.

The equality for -Q1- again provides a two-fold transformation (two-fold multiplication by matrices), which is also mathematically correct. This two-fold transformation is realised in the calculator 29, because the weighting coefficients $(0,FS(1), \ldots, FS(d), FW(1), \ldots, FW(d))$ of both matrices are stored away in the store 32, already multiplied with each other. Thus, a transformation (matrix multiplication) is carried through.

The spectral values are weighted at the sending-side with a weighting function, that is to say, multiplied with a factor less than 1. At the receiving side, the weighting factors corresponding to the sending-side weighting factors are reciprocal. The weighting factors are stated in the previously mentioned dissertation work.

Figure 5:
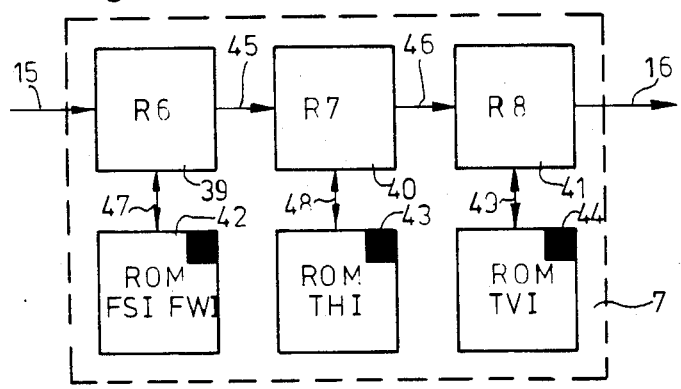
FIG. 5 shows a two-dimensional reverse transforming circuit with weighting.

FIG. 5 shows a block diagram of a reverse transformer 7, which, having regard to the second weighting functions at the sending side, counter-balances these second weighting functions. To this end the weighted spectral coefficients are applied by way of the eight bit parallel data conductors 15 to the calculator 39 which calls up the third weighting factors from the store 42, by way of a data-, address- and control conductor 47, and multiplies them with the spectral coefficients. The third weighting factors are reciprocal of the second weighting factors at the sending-side. The data from the calculator 39 are passed on, by way of an eight-bit parallel data bus 45 to calculator 40, where an inverse transformation of the spectral coefficients takes place. The reverse transformation coefficients are called from the store 43, which is connected with the calculator 40 by way of data-, control and address bus 48.

For the next one dimensional tranformation, the one dimension reverse transformed spectral coefficients are entered by way of eight-bit data conductor 46 in the calculator 41 where the second one dimensional reverse transformation takes place. To this end, reverse transformation coefficients are delivered to the calculator 41 by way of the control- and address-counter 49. There then arises on the conductor 16 the reverse transformed digitalised video signals.

$$-R6A- = -T3- * -E-,$$
$$-Z- = -R6A- * -T4- \text{ and}$$

|      |        |   |   |   |   |   |   |        |     |        |   |   |   |   |   |   |        |   |
|------|--------|---|---|---|---|---|---|--------|-----|--------|---|---|---|---|---|---|--------|---|
|      | -FSi(1)| 0 | 0 | 0 | 0 | 0 | 0 | 0      | .   | -FWi(1)| 0 | 0 | 0 | 0 | 0 | 0 | 0      | . |
|      | -0     | — | 0 | 0 | 0 | 0 | 0 | 0      | .   | -0     | — | 0 | 0 | 0 | 0 | 0 | 0      | . |
|      | -0     | 0 | — | 0 | 0 | 0 | 0 | 0      | .   | -0     | 0 | — | 0 | 0 | 0 | 0 | 0      | . |
| -Q2- = | -0   | 0 | 0 | — | 0 | 0 | 0 | 0      | -*-Z-* | -0   | 0 | 0 | — | 0 | 0 | 0 | 0      | . |
|      | -0     | 0 | 0 | 0 | — | 0 | 0 | 0      | .   | -0     | 0 | 0 | 0 | — | 0 | 0 | 0      | . |
|      | -0     | 0 | 0 | 0 | 0 | — | 0 | 0      | .   | -0     | 0 | 0 | 0 | 0 | — | 0 | 0      | . |
|      | -0     | 0 | 0 | 0 | 0 | 0 | — | 0      | .   | -0     | 0 | 0 | 0 | 0 | 0 | — | 0      | . |
|      | -0     | 0 | 0 | 0 | 0 | 0 | 0 | FSi(d) | .   | -0     | 0 | 0 | 0 | 0 | 0 | 0 | FWi(d) | . |

Therein, the following meanings apply:
  d: number of the picture point of the picture pointmatrix in horizontal or vertical direction,
  $FW(i),: i=1 \ldots d$, inverse weighting function for a horizontal direction,
  $FSi(i),: i=1 \ldots d$, inverse weighting function for a vertical direction,
  -R6A-: spectral coefficient matrix at the output of the calculator 39,
  -Z-: spectral coefficient matrix at the output of the calculator 40,
  -Q2-: spectral coefficient matrix at the output of the calculator 41,
  -T3-: transformation coefficients in the store 42,
  -T4-: transformation coefficients in the store 43.

Figure 6:
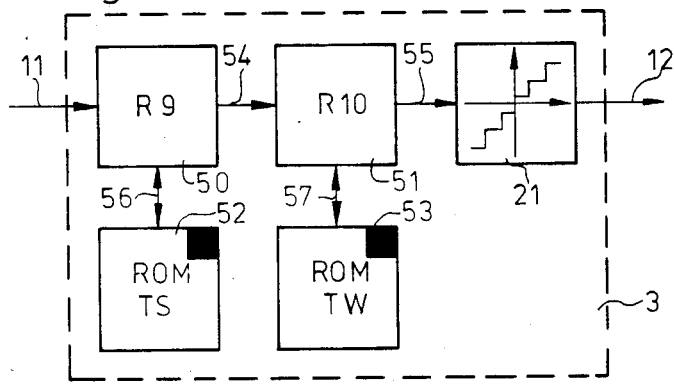
FIG. 6 shows a two-dimensional transforming circuit with integrated weighting.

FIG. 6 shows the block diagram of a rapidly built and constructionally simple transformer 3. With it, the two one-dimensional tranformations are carried out serially, and the weighting factors are already entered in the two stores 52 and 53 so that an additional store is redundant. It is not the spectral coefficients but the transformation coefficients which are weighted.

Digitalised video signals are presented to the calculator 50 by way of the data bus 11, which has eight data conductors. The calculator 50 calls up from the store 52 the respective transformation coefficients by way of the data bus of the combined control-, address- and data-bus 56. The values from the digitalised video signals are multiplied with the weighted transformation coefficients in the calculator 50 and passed on to the calculator 51 by way of the data-bus 54.

The calculator 51 calls the respective weighted transformation coefficients from the store 53 for the second one-dimensional transformation, the summons being made by way of the data-, address- and control conductors of the data-, address- and control bus 57. The second one-dimensional transformation is carried out in the calculator 51 and is delivered to the quantiser 21 by way of the data-bus 55, which exhibits eight data conductors. After the quantisation, eight bits in parallel are propagated by way of the data-bus 12. The weighting coefficients are incorporated in the horizontal or vertical transformation coefficients in the stores 52 and 53.

There arises then, for the circuit according to the invention

-R9A-=-TS-*-E-

-QE-=-R9A-*-TW-.

Therein the following meanings apply:
- -R9A-: one-dimensional spectral coefficient matrix at the output of the calculator 50,
- -TS-: weighted transformation coefficient matrix for the vertical direction in the store 52,
- -E-: digitalised picture signals in matrix form.
- -QE-: two-dimensional spectral coefficient matrix at the output of the calculator 51,
- -TW-: weighted transformation coefficient matrix for the horizontal direction in the store 53.

Figure 7:
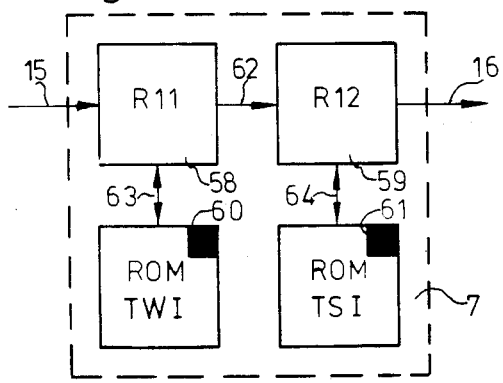

FIG. 7 shows the block diagram of the reverse transformer 7, which carries through reverse transformation functions. The store 60 has stored away the horizontal transformation coefficients which incorporated weighting coefficients for a first one-dimensional transformation. The store 61 has stored away the vertical transformation coefficients with incorporated weighting coefficients for a second one-dimensional transformation.

Eight bits in parallel are applied by way of the data-bus 15 to the calculator 58, which calls up the respective transformation coefficients by way of the control-, data- and address bus 63 and multiplies them with the data arriving over the data-bus 15. Eight bits in parallel are supplied by way of eight data conductors over the data-bus 62 to the calculator 59. The respective transformation coefficients, which in the first place consist of the vertical transformation coefficients and the vertical weighting coefficients incorporated therein, are in the second place one-dimensionally transformed using coefficients and one-dimensionally transformed spectral coefficients provided in data-, control- and address-bus 64, and the result is passed on to the DAU 8 by way of the data-bus on eight data conductors.

There arises then, for the circuit according to the invention:

-R11A-=-TWi-*-KA-

-A1-=-R11A-*-TSI-.

Therein, the following meanings apply:
- -R11A-: one dimensional spectral coefficient matrix at the output of the calculator 58,
- -TWI-: weighted reverse transformation coefficient matrix for the vertical direction in the store 60,
- -KA-: two dimensional spectral coefficient matrix at the input of the calculator 58, at the output of the magnetic store 5 or upon transmission to the channel output KA,
- -A1-: digitalised picture signals in matrix form,
- -TSI-: weighted reverse-transformation coefficient matrix for the horizontal direction in the store 61.

If the data rate is so high that the data cannot be multiplied serially it is necessary to connect, for example, d*d multipliers in parallel (d=number of pictur points of the picture point matrix in horizontal or vertical direction). In all, up to 2*d*d multipliers are then additionally necessary.

The circuit so far described works as follows: FIG. 8 shows a process sequence with process steps 70-80. Therein, in a first process step 70, horizontal and vertical weighting functions are introduced. In the simplest case, the weighting functions are a constant factor. In a second process step 71, a DCT- and an inverse DCT-coefficient matrix is calculated. In a third process step 73 a modified DCT- and a modified inverse DCT-coefficient matrix is set up. To this purpose, the weighting functions in the DCT- and in the inverse DCT-coefficient matrix are employed. As a fourth process step, there occurs the block presentation of digitalised video signals, in the following called picture data, which are arranged as a picture segment displaying 8×8 picture points assembled in matrix-form. These picture data are transformed in the process step 74 into spectral coefficients with a DCT which exhibits the weighted transformation coefficients. In the next following process step 75, these derived spectral coefficients are quantised. In the process step 76, the quantised spectral coefficients are stored. In the process step 77, the stored spectral coefficients are reverse transformed, which means that they are transformed with the inverse DCT with inverse weighting. After the process step 77, there appears as process step 78 an 8×8 picture point size block with transformed and reverse transformed digitalised video signals. In a process step 79, it is questioned if all data has been taken into consideration belonging to a picture, a sequence, a video signal or another data mix. If this is not the case, one returns from the enquiry 79 to the process step 73 and repeats it. If it is established in process step 79, that all data have been worked through, the process is ended by a process step 80.

We claim:

1. A method for the transmission of a video signal, said method comprising the steps of:
    converting video signals to digitalized video signals;
    transforming each of said digitalized video signals to a frequency domain wherein said each incoming digitalized video signal being multiplied by a transformation coefficient to form a transformed digitalized video signal;
    quantizing each of said transformed digitalized video signals by weighting each of said transformed digitalized video signals with a spectral value to derive a corresponding spectral coefficient so that only said transformed digitalized video signals in the frequency domain being perceptible to the human eye become spectral coefficients;
    performing an inverse function of said step of transforming wherein each of said spectral coefficients being translated from the frequency domain to a time domain and reverse-transformed digitalized signals;
    converting said reverse-transformed digitalized signals to reverse-transformed analogue signals; and
    displaying said reverse-transformed analogue signals on a picture screen wherein any irrelevant and redundant portions of said digitalized video signals are suppressed and filtered out so that said reverse-transformed analogue signals may be different than said digitalized video signals.

2. The method according to claim 1, wherein the step of transforming further comprising a discrete cosine transformation.

3. The method according to claim 1, wherein the step of transforming further comprising a serial two one-dimensional transform.

4. The method according to claim 1, wherein said step of performing further comprising the step of:
    performing a reverse transformation by multiplying said spectral coefficients by a reverse transformation coefficient for the vertical direction and multiplying again for the horizontal direction.

5. The method according to claim 1, wherein the step of quantising further comprising a second weighting of each of said transformed digitalised video signals with a second spectral value to derive a corresponding second spectral coefficient so that only said transformed digitalised video signals in the frequency domain being perceptible to the human eye become second spectral coefficients.

6. The method according to claim 5, wherein said step of performing further comprising the step of:
performing a second reverse transformation by multiplying said spectral coefficients by a second reverse transformation coefficient wherein said second reverse transformation being the reciprocal of said second spectral coefficients.

7. The method according to claim 1, wherein said step of converting further comprising the step of:
forming a matrix of said digitalised video signals, wherein said analogue signals represent video picture data being arranged as 8×8 picture points.

8. The method according to claim 7, wherein the step of performing further comprising an inverse discrete cosine transformation.

9. The method according to claim 8, wherein the step of transforming further comprising the step of:
multiplying said matrix a first and a second time with said transformation coefficients wherein said first time being a vertical transform and said second time being a horizontal transform.

10. A method for the transmission of a video signal, said method comprising the steps of:
converting analogue video signals to digitalised video signals;
transforming each of said digitalised video signals to a frequency domain wherein said each incoming digitalised video signal being multiplied by a weighted transformation coefficient to form transformed digitalised video signals;
quantising said transformed digitalised video signals to derive a corresponding spectral coefficient so that only said transformed digitalised video signals in the frequency domain being perceptible to the human eye become spectral coefficients;
performing an inverse function of said step of transforming wherein each of said spectral coefficients being translated from the frequency domain to a time domain and reverse-transformed digitalised signals;
converting said reverse-transformed digitalised signals to reverse-transformed analogue signals; and
displaying said reverse-transformed analogue signals on a picture screen wherein any irrelevant and redundant portions of said digitalised video signals are suppressed and filtered out so that said reverse-transformed analogue signals may be different than said digitalised video signals.

11. The method according to claim 10, wherein said step of converting further comprising the step of:
forming a matrix of said digitalised video signals wherein said analogue signals represent video picture data being arranged as 8×8 picture points.

12. The method according to claim 10, wherein the step of performing further comprising an inverse discrete cosine transformation.

13. The method according to claim 10, wherein the step of transforming further comprising a serial two one-dimensional transform.

14. The method according to claim 10, wherein the step of transforming further comprising a discrete cosine transformation.

15. The method according to claim 14, wherein the step of transforming further comprising the step of:
multiplying said matrix a first and a second time with said weighted transformation coefficients wherein said first time being a vertical transform and said second time being a horizontal transform.

* * * * *